United States Patent

Wanner et al.

[11] Patent Number: 5,214,767
[45] Date of Patent: May 25, 1993

[54] FULL ADDRESS AND ODD BOUNDARY DIRECT MEMORY ACCESS CONTROLLER WHICH DETERMINES ADDRESS SIZE BY COUNTING THE INPUT ADDRESS BYTES

[75] Inventors: Christopher C. Wanner, Houston; Alan L. Goodrum; Paul R. Culley, both of Cypress, all of Tex.

[73] Assignee: Compaq Computer Corp., Houston, Tex.

[21] Appl. No.: 307,773

[22] Filed: Feb. 7, 1989

[51] Int. Cl.⁵ .................................. G06F 12/02
[52] U.S. Cl. .................. 395/425; 364/969.1; 364/966.3; 364/964.33; 364/963; 364/DIG. 2
[58] Field of Search ... 364/200 MS File, 900 MS File; 395/325, 375, 275, 400, 425

[56] References Cited

U.S. PATENT DOCUMENTS

| | | | |
|---|---|---|---|
| 4,340,932 | 7/1982 | Bakula | 364/200 |
| 4,340,932 | 7/1982 | Bakula | 364/200 |
| 4,378,591 | 3/1983 | Lemay | 364/200 |
| 4,466,055 | 8/1984 | Kinoshita | 364/200 |
| 4,514,808 | 4/1985 | Murayama | 364/200 |
| 4,530,053 | 7/1985 | Kriz | 364/200 |
| 4,627,021 | 12/1986 | Persoon | 364/900 |
| 4,631,671 | 12/1986 | Kawashita | 364/200 |
| 4,683,534 | 7/1987 | Tietjen | 364/200 |
| 4,688,166 | 8/1987 | Schneider | 364/200 |
| 4,691,282 | 9/1987 | Kinsohita | 364/200 |
| 4,695,948 | 9/1987 | Blevins | 364/200 |
| 4,716,523 | 12/1987 | Burrus | 364/200 |
| 4,766,538 | 8/1988 | Miyoshi | 364/200 |
| 4,774,652 | 9/1988 | Dhuey | 364/200 |
| 4,797,853 | 1/1989 | Savage | 364/900 |
| 4,825,358 | 4/1989 | Letwin | 364/200 |
| 4,831,522 | 5/1989 | Henderson | 364/200 |
| 4,849,875 | 7/1989 | Fairman | 364/200 |
| 4,878,166 | 10/1989 | Johnson | 364/200 |
| 4,920,483 | 4/1990 | Pogue | 364/200 |
| 4,933,846 | 6/1990 | Humphrey | 370/85.1 |
| 4,970,642 | 11/1990 | Yamamura | 364/200 |
| 4,974,143 | 11/1990 | Yamada | 364/200 |
| 4,987,537 | 1/1991 | Kawata | 364/200 |
| 4,992,976 | 2/1991 | Yonekura | 364/900 |

OTHER PUBLICATIONS

IBM Corp., Personal System/2 Model 80 Technical Reference, First Edition, Apr. 1987, pp. 3-15 to 3-27.

Primary Examiner—Thomas C. Lee
Assistant Examiner—Eric Coleman
Attorney, Agent, or Firm—Pravel, Hewitt, Kimball & Krieger

[57] ABSTRACT

A computer system which includes a direct memory access (DMA) controller which can provide a 32 bit memory address and yet can also provide 24 bit memory address operation to remain compatible with previous systems. The DMA controller also monitors system operation and if only 24 bit address operations are occurring under the control of an external bus master or the DMA controller, the DMA controller drives the top memory address byte provided to a cache memory controller to help insure cache coherency. Additionally, the DMA controller can provide optimal time transfers for word width transfer between an odd starting memory address and an even starting input/output port.

14 Claims, 10 Drawing Sheets

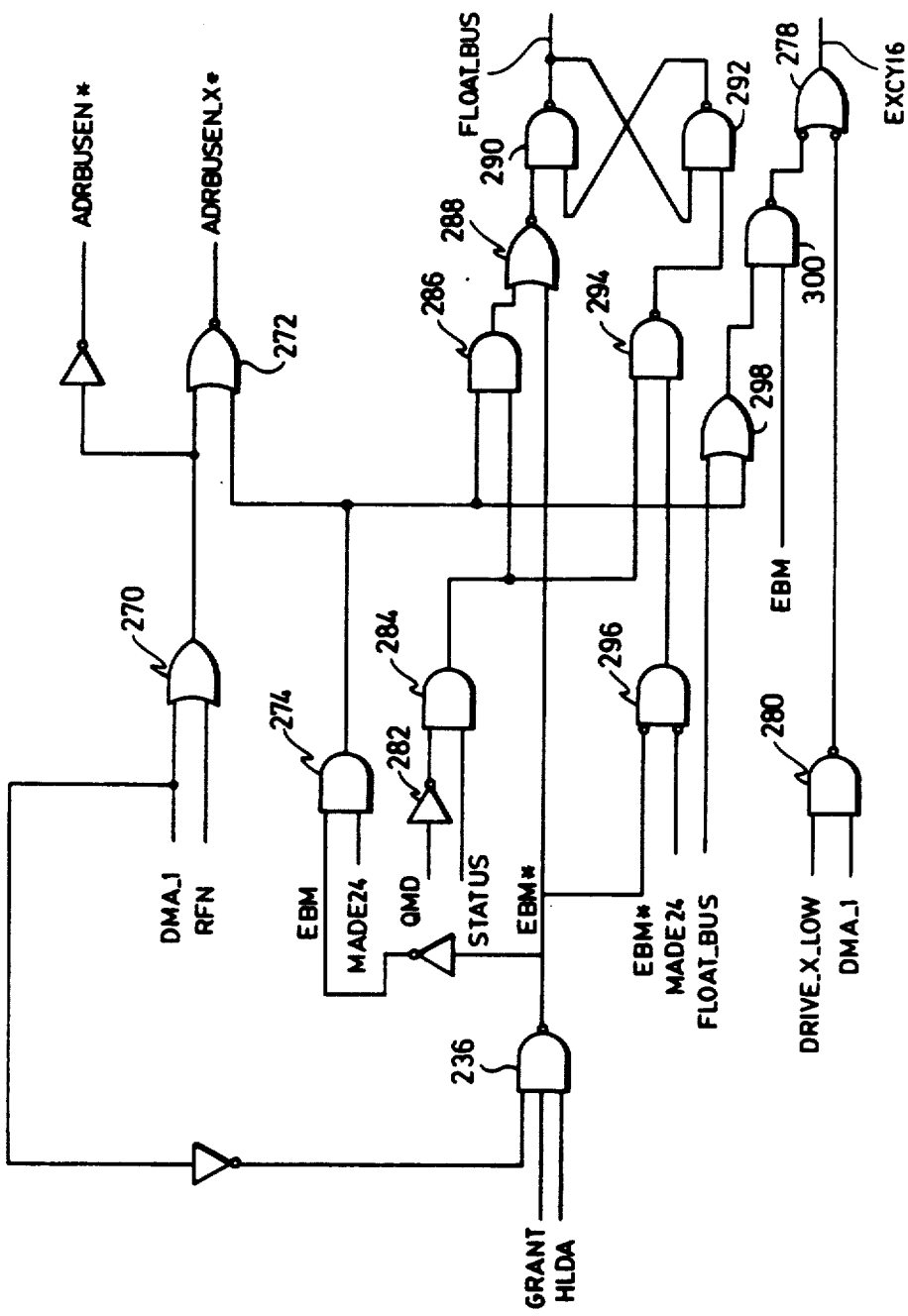
FIG.5
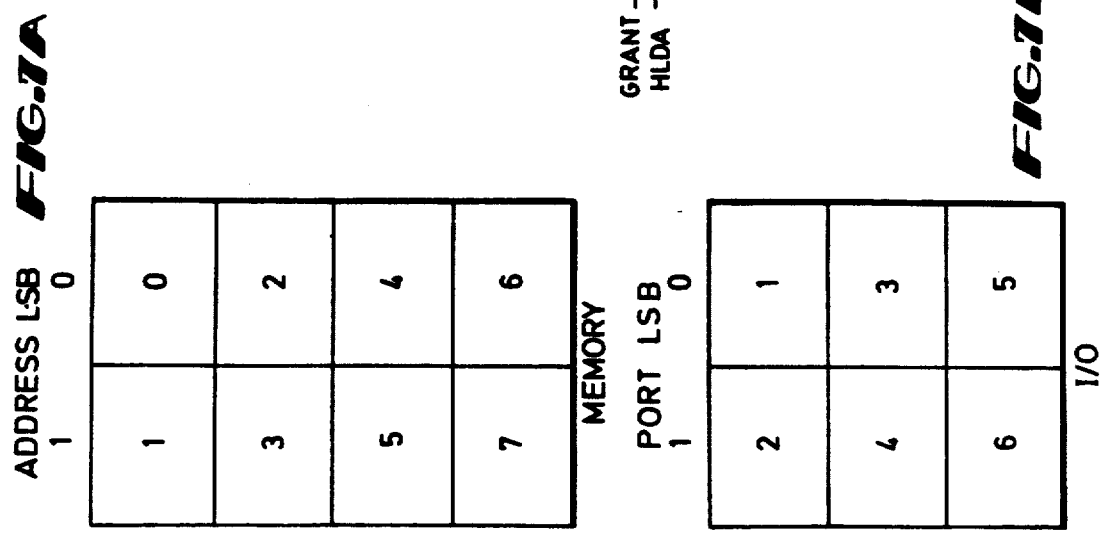
FIG.7A
FIG.7B

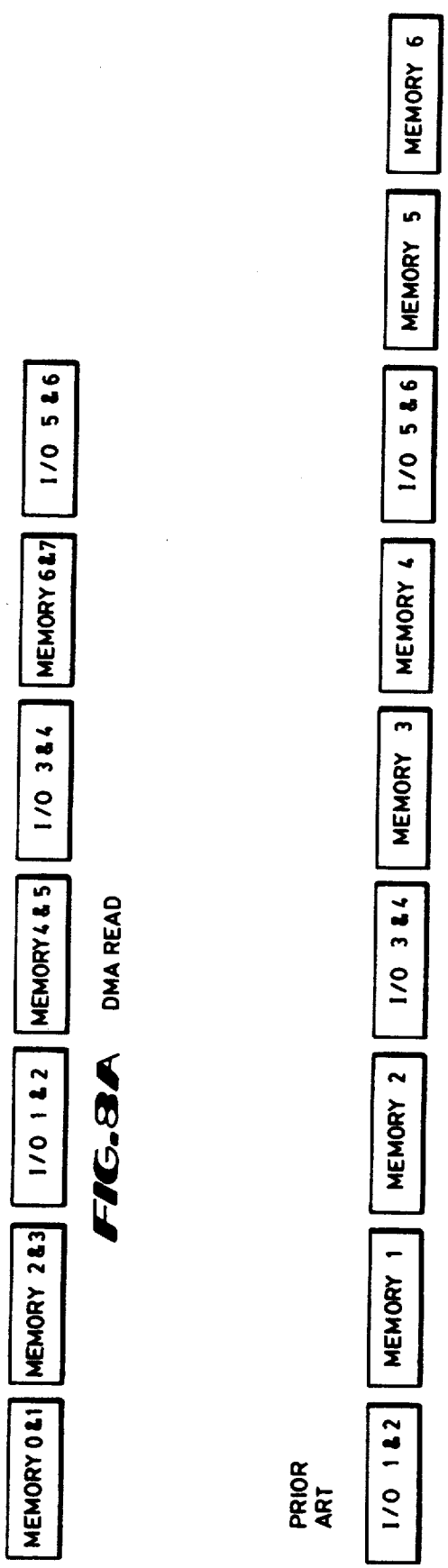

FULL ADDRESS AND ODD BOUNDARY DIRECT MEMORY ACCESS CONTROLLER WHICH DETERMINES ADDRESS SIZE BY COUNTING THE INPUT ADDRESS BYTES

BACKGROUND OF THE INVENTION

1. Field of the Invention

The invention relates to memory and input/output space data control systems used in computer systems, and more particularly to systems utilizing direct memory access techniques.

2. Description of the Related Art

Personal computer systems are becoming increasingly prevalent and increasingly more powerful. Computer systems have always had the problem of transferring information from a device to memory for use by the computer and from memory to various devices for storage or operation purposes. In early personal computer designs these transfers between the memory space and the input/output space associated with various peripheral devices such as disk controllers, displays, keyboards, and serial or parallel interface units were directly performed by the microprocessor in the computer system. As the capabilities of the various devices increased this transfer task became a burden on the microprocessor and other approaches were developed to free the microprocessor from this effort. One of these approaches was direct memory access (DMA), where a different controller handled the task of coordinating and performing the transfers once the necessary transfer information was provided to the DMA controller. The DMA controller was provided with the memory address information and other parameters. When operating, the DMA controller provided the address values to the system bus and drive the various control signals as necessary to cause the transfer operation to occur between the memory space and the I/O space.

This DMA technique was incorporated into the original IBM PC produced by International Business Machines Corp. (IBM). The IBM PC was based on the Intel Corporation (Intel) 8088 microprocessor, which had 20 address lines and transferred data over an 8 bit wide path. The DMA controller included in the IBM PC therefore only needed to use a 20 bit address and transfer data in one byte packages. This original DMA controller had eight channels, allowing transfers between eight different devices and memory to be programmed and operate without further microprocessor attention.

The capabilities of the devices and components that could be used and incorporated in personal computers continued to advance and users requested the advances to allow more complex programs to be developed and used. Eventually the IBM PC, and its hard disk-based relative, the PC/XT, were considered unsatisfactory. IBM introduced the IBM PC/AT or AT, utilizing the Intel 80286 microprocessor and incorporating more advanced capabilities. The 80286 and the AT could use 24 bits of address information and could transfer data over a 16 bit bus. However, this extended addressing capability and need to handle two data widths necessitated redesign of the DMA system. The DMA system was redesigned to handle the wider address and data buses, with certain channels designated for byte operations and certain channels designated for word operation.

Once again, the capabilities of components and peripheral devices proceeded to increase and users continued to demand the performance available. Several different events occurred in an attempt to help resolve the performance demand situation. One event was the introduction by IBM of the PS/2 line of personal computers. One perceived limitation of the AT was the inefficient method of allowing for multiple bus masters. A bus master is a device which can take full control of the system buses for its own purposes. The general cases where bus masters are used are cases which need greater peripheral performance than available using a DMA controller. Members of the PS/2 line utilized the MicroChannel Architecture or MCA to improve bus mastering capabilities, as well as other system capabilities. The operation of the MCA is more fully defined in the IBM Personal System/2 Model 80 Technical Reference Manual, bearing a copyright date of 1987 and published by IBM.

The MCA utilized a revised DMA control system. The DMA control system was compatible with previous computer programs but offered extended features not previously available, including a different method of providing the DMA controller with the information necessary for its operation. The extended method of providing the information utilized passing memory address information uniformly through two input/output (I/O) space locations or I/O ports, instead of the 16 I/O ports previously needed. A channel was selected at a first I/O port and the address information was passed through a second I/O port. The DMA controller also operated in two phases, a first phase where the data to be transferred was read and a second phase where the data was written, instead of the single phase operation used in the previous systems.

However, the DMA system in the MCA was limited in that it could only utilize 24 bits of address. The host microprocessor and the bus masters could utilize 32 bits of address information, but the DMA controller was limited to 24 bits. These 24 bits were provided conventionally or through three successive accesses to the new I/O port.

An additional limitation of the DMA controller was that data could not be readily transferred between an I/O port and a memory location starting on an odd address using word wide operations. The data could only effectively be interchanged with the memory in byte wide operations. For example, during a DMA read operation, the DMA controller obtained the data from the memory in bytes, assembled the individual bytes into the proper word and then transferred this word to the I/O port of the device. This resulted in DMA operations that took much longer than necessary to operate and thus reduced the performance of the computer system.

An additional problem with computer systems implementing the MCA was that if a device having only a 24 bit wide address, such as the DMA controller or a bus master, were driving the system bus, the upper 8 bits of the address bus were floated. This presented a cache coherency problem should a cache controller be present in the computer system. A cache controller is used in conjunction with cache memory to increase the performance of the computer system. Cache memory is fast memory which allows the microprocessor to operate at full speed, unlike main memory which, for cost reasons, is slower and often reduces the speed of the microprocessor from maximum available rates. Identical copies of data are contained in both memories, with the cache controller noting when main memory locations are accessed and deleting that reference in the cache. The cache controller uses all 32 bits of address to perform its tasks, but when the upper 8 bits of the address bus are floating there is no guarantee that the cache controller is receiving the same address as the involved memory units. Thus a possible coherency problem between the data maintained in the cache memory and in the main memory may result during 24 bit address MCA operations.

The second event of interest was the introduction of the 80386 microprocessor by Intel. This was an enhanced machine that had a full 32 bit address and could operate using 32 bit wide data. The use of this microprocessor allowed the capabilities of the computer system to be greatly enhanced. Users could access vast amounts of memory if desired and transfer data at very high rates over a 32 bit data bus. The large address space allowed programmers to use as much space as needed to position applications where desired, not where forced.

However, a problem occurred when the 80386 was used in an MCA machine. The 80386 used 32 address lines, but the DMA system in the MCA used only 24 address lines. Thus the freedom made available to programmers by the use of the 80386 was taken away if DMA operations were to be performed because of the 24 bit address limitation.

SUMMARY OF THE INVENTION

A computer system incorporating the present invention is MCA-compatible and yet can have a 32 bit DMA address and can perform word transfers to or from odd memory addresses. Additionally, a computer system using the present invention does not have a cache coherency problem when only a 24 bit address is being utilized on the system bus and the remaining system address bus lines are floating.

A byte pointer is used in conjunction with the I/O port used to provide memory address information to the DMA controller. The byte pointer progressively counts as each byte of information is provided to allow proper storage in the DMA memory. If only three bytes of information are provided, this is interpreted as a compatible mode transfer and so when that particular channel is operational, only 24 address bits are utilized and the upper 8 bits of the system address bus are floated. If four bytes are provided, the full 32 bit address is used with the system bus. If 24 bit operation is occurring, the address provided by the DMA controller increments or rolls over according to a 24 bit sequence, even though the counter is a full 32 bit counter. If 32 bit operation is occurring, the counter rolls over according to a 32 bit sequence. The 24 or 32 bit operation is individually controllable for each channel of the DMA controller. The programmer thus can utilize all the available memory address space and not be artificially limited to a 24 bit wide address space, but can still operate in 24 bit address capability mode if desired.

The DMA controller includes multiplexing and latching circuitry used to allow odd memory address word wide transfers. Several different alternative designs are used. In all the designs, during a DMA read operation the first byte of data is obtained from the memory and temporarily stored. The next word, which is at an even address, is obtained. The first byte and the even byte of the second access are swapped and then provided to the data bus during the I/O write operation. The next even memory address is read, the odd byte stored temporarily and the even byte and the previous odd byte written to the I/O port. A final memory read operation obtains the next byte or word and stores it. To complete the sequence, the final even byte and previous odd byte are written, with the last stored odd byte not written and effectively discarded. During DMA write operations, the sequence is reversed and the word read from the I/O port is stored. The even byte is written to the odd memory address in byte fashion. The next word is read from the I/O port, with the odd byte stored temporarily in a different location than the previous odd byte. The previous odd byte and the even byte are then swapped and written to an even memory address in a word wide transfer. To complete operation, the final odd byte is written in byte form to the even memory address. The operations are thus performed in the minimum possible time and the performance of the computer system increased.

A DMA controller according to the present invention also determines when a bus master which utilizes only 24 address lines is controlling the system bus. When the DMA controller is operating in 24 bit mode or a 24 bit address bus master is in control, the DMA controller floats the top 8 bits of the system address bus and drives the top 8 bits of an address bus connected to the cache controller to a low state. The cache controller thus sees a valid address at all times and the coherency problem does not arise during 24 bit address operations.

BRIEF DESCRIPTION OF THE DRAWINGS

A better understanding of the invention can be obtained when the following detailed description of the various embodiments is considered in conjunction with the following drawings, in which:

FIGS. 2, 3, 4 and 5 are schematic circuit diagrams of portions of the byte pointer and address bus logic of a DMA controller incorporating the present invention;

FIGS. 7A and 7B is a charts identifying locations of data to be transferred;

FIGS. 8A and 8B are logical operation representations for DMA read and write operations for the prior art and the present invention.

DETAILED DESCRIPTION OF THE PREFERRED EMBODIMENT

Figure 1:
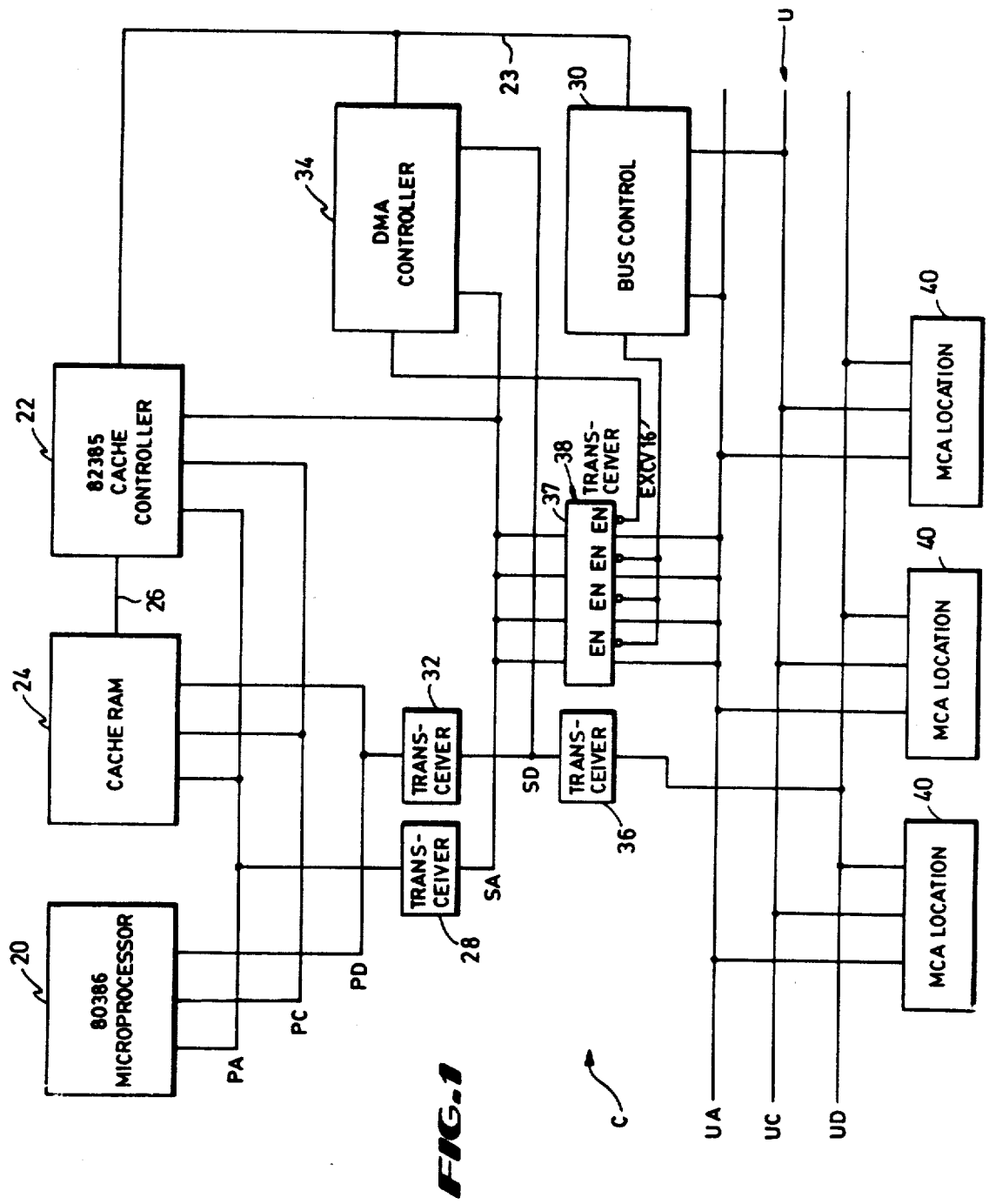
FIG. 1 is a block diagram of a computer system incorporating the present invention.

Referring now to FIG. 1, the letter C generally represents a computer system incorporating the present invention. The computer system C incorporates a microprocessor 20, preferably an Intel 80386 microprocessor. Connected directly to the microprocessor 20 via a processor address bus PA, a processor control bus PC and a processor data bus PD are a cache controller 22, preferably an Intel 82385, and cache random access memory (RAM) 24. The cache controller 22 is connected to the cache RAM 24 by means of control lines 26. This is considered the local microprocessor bus and is provided with a cache system to allow increased operational speed of the computer system C. The processor address bus PA is preferably 32 bits wide, while the processor data bus PD is also preferably 32 bits wide.

The processor address bus PA is connected to an intermediate address bus SA by means of a transceiver 28. This transceiver 28 is preferably 32 bits wide and is appropriately controlled by a bus controller 30, the connections to which are not shown for clarity. The bus controller 30 monitors and provides the control signals necessary to interface the devices on the processor buses PA, PD and PC to the remaining portions of the computer system C. The processor data bus PD is connected to an intermediate data bus SD by means of a transceiver 32. Operationally connected to the intermediate address and data buses SA and SD is a DMA controller 34. The DMA controller 34 is used to provide the basic control and information storage capabilities necessary for DMA operations, and in the preferred embodiment, includes the necessary circuitry to perform 32 bit DMA addressing and to allow the cache controller 22 to properly operate when a 24 bit address is present in the computer system C. The cache controller 22 is also connected to the intermediate address bus SA to allow the snooping feature of the 82385 to be utilized. The snooping feature allows the 82385 to monitor a second address bus. If the 82385 determines that a value is being written to a memory location which has its information duplicated in the cache, the tag in the 82385 is cleared, effectively removing that memory location from the cache.

A control signal bus 23 is provided between the cache controller 22, the DMA controller 34, and the bus controller 30. The bus controller 30 not only controls the various transceivers used between the buses, but also provides the actual control signals and control interface to the buses comprising the MicroChannel Architecture (MCA) which is utilized in the computer system C.

The MCA implementation in the preferred embodiment includes three buses, the address bus UA, the control bus UC, and the data bus UD, the composite of these buses being referred to as the system bus U. These buses conform to the MCA architecture as previously referenced. The system data bus UD is connected to the intermediate data bus SD by means of a transceiver 36, whose control is provided by the bus control logic 30. Connecting the system address bus UA to the intermediate address bus SA are four 8 bit transceiver circuits forming a 32 bit address transceiver 38. The direction control (not shown) for all four of the elements in the address transceiver 38 and the enable control for the lower three bytes are provided by the bus control logic 30 according to whether the microprocessor 20 needs to utilize the system bus U, whether the DMA controller 34 needs to access the system bus U, or whether an external bus master located on the system bus U needs to access the various system resources. The enable control for the top byte 37 of the address transceiver 38 is provided by a signal referred to as EXCY16, driven by the DMA controller 34. The EXCY16 signal is used to disable operation of the top byte transceiver 37 when an external bus master is controlling the system bus U, is providing information to the intermediate address bus SA and the address value is only 24 bits wide so that the address information that would possibly be provided to the top byte of intermediate address bus SA is not valid. As stated in the background, this poses a potential problem because the cache controller 22 may receive erroneous address information that would not allow proper performance of the snooping function, thus allowing coherency problems to develop. The DMA controller 34 in the preferred embodiment determines when this operation is occurring and if so, drives the upper 8 bits of the intermediate address bus SA to a zero state so that a proper address is presented to the cache controller 22. Also attached to the system bus U are the various MCA connectors associated with the MCA locations 40.

The DMA controller 34 according to the present invention may utilize 32 bit wide addresses for operation. However, the access methods of the previous systems wherein separate I/O ports or addresses are provided for the lower word of the memory address and the byte of the page table address which provides the next byte of the address value are insufficient to provide a 32 bit wide address. However, the MCA provides a second method, called the extended function technique, which allows address value loading to be performed through only two I/O ports or addresses. To provide a memory address for a specific channel according to the MCA, the coded value of the DMA channel to be operated on is first placed in the extended function register at I/O port 18, along with the appropriate code indicating that a memory address register operation is to be performed. This operation to I/O port 18 resets a byte pointer which indicates which byte of the memory address value storage memory is being accessed through an extended function execute port, which is at I/O port 1A. However, in the previous implentations of the MCA the byte pointer only extended to three bytes for memory access operations, not to the necessary value of four needed for full 32 bit wide address operations.

The DMA controller 34 according to the present invention extends the capability of the byte pointer to four bytes. A three bit master slave counter 100 (FIG. 2) is provided to enable the three bits used to count as required. The master stage of the counter 100 consists of three D-type latches 102, 104 and 106. The enable to the master stage latches 102, 104 and 106 is the PNTR_CLK signal and is provided from an AND gate 108. One input to the AND gate 108 is a PULSE signal which occurs effectively with the valid time of the status information on the system control bus UC. The presence of this pulse is sufficiently delayed with respect to the presentation of the address on the intermediate address bus SA so that the address values have had time to be decoded. The other input to the AND gate 108 is provided from an OR gate 110. One of the two inputs to the OR gate 110 is the output of a two input NAND gate 112. In turn the two inputs to the NAND gate 112 are the EXTCMD2* and EXTCMD3* signals which when low indicate that a memory address value read or write operation is to occur each time the extended function execution port is accessed. The other input to the OR gate 110 is provided from a five input NAND gate 114. The five different inputs to this NAND gate 114 are a DECODE_TCR* signal, a DECODE_MAR* signal, an EXTCMD0* signal, an EXTCMD4* signal and an EXTCMD5* signal. These signals represent, respectively, a valid address decode to the transfer count register of the DMA controller 34 and a valid address decode to the memory address register of the DMA controller 34 using non-extended operations and the presence of extended commands 0, 4 or 5. Therefore, the PNTR_CLK signal is pulsed when an operation wherein an external command that utilizes the byte pointer is to occur or the decoded I/O port address is that of a transfer count register or a memory address register. These are the operations in which it is necessary for the byte counter 100 to advance.

The second stage or slave stage of the counter 100 consists of three D-type latches 116, 118 and 120. The enabling signal to these latches 116, 118 and 120 is provided by the CMD* signal from the system control bus UC, whose timing is such that the necessary data will have been latched into the master latches 102, 104 and 106 and will then be present at the inputs to the slave latches 116, 118 and 120. The output of the slave latches 116, 118 and 120 is representative of the byte pointer value and is comprised of signals BP<0>, BP<1> and BP<2> and their respective inverses, which have an asterisk after the signal name. Generally in this description a signal having an asterisk as the last character is a true low signal, but may also refer to the inverse of a true high signal.

The clear signal to all the latches in the counter 100 is provided by an AND gate 122. One input to this AND gate 122 is the inverted MCLR signal, the MCLR signal indicating that a DMA master clear request has occurred, either by means of the extended function register or directly. The other input to the AND gate 122 is provided by a NAND gate 124. One input to the NAND gate 124 is a WR_PULSE signal, which has timing similar to the PULSE signal but occurs only when a write operation is occurring. The other input to the NAND gate 124 is the output of a NAND gate 126. The inputs to the NAND gate 126 are the DECODE_EFR* and the DECODE_CLRBP* signals, which represent, respectively, a signal which is low when the decoded extended function register port address is present or when the direct clear byte pointer address is present. These two activities cause the byte pointer to automatically be cleared to commence the counting operation. Thus the counter 100 is cleared when requested or on each write operation to the extended function register.

The outputs of the slave latches 116, 118 and 120 are encoded to produce BYTE0, BYTE1, BYTE2 and BYTE3 signals, which indicate which byte of the memory address, I/O port or transfer count is actually being pointed to by the byte counter 100. The BYTE0 and BYTE1 signals are provided by the outputs of 2:1 multiplexers 128 and 130. The input selection or gating of the multiplexers 128 and 130 is determined by the state of the DECODE_EFX* signal, which indicates that an extended function execution port address is present. The A or selector low level input channel of the BYTE0 multiplexer 128 is the output of an AND gate 127 which combines the BYTE3 signal, the BP<1>* signal and the BP<0>* signal. The B or high selector high level input is the BP<0>* signal. If the extended function operation is not being executed, then the byte pointer need only be a simple one bit latch and the BYTE0 and BYTE1 signals used. Thus, based on the state of the DECODE_EFX* signal, the BYTE0 multiplexer 128 produces either the fully coded AND of the three signals or is based on a toggle of the least significant bit of the counter 100.

The A input to the BYTE1 multiplexer 130 is the output of an AND gate 129 which combines the BP<0> and BP<1>* signals, which represents a binary value of 1 for the counter 100. The B channel input is connected to the BP<0>* signal. The BYTE2 signal is produced by an AND gate 131 which combines the BP<1> s(gnal, the BP<0>* signal and the DECODE_EFX signal. The BYTE3 signal is provided by an AND gate 133 which combines the BP<2> signal and the DECODE_EFX signal.

The counter 100 is designed such that it only counts from 000 to 001 to 010 to 100 to 000 and then recycles for extended function memory address operations or from 000 to 001 to 010 to 001 and then recycles for all other operations. This counting cycle is partially developed by having the D input to the least significant master latch 106 receive the output from a NOR gate 132. One input to the NOR gate 132 is the BYTE3 signal while the other input to the NOR gate 132 is provided by an AND/OR INVERT (AOI) gate 134. The inputs to one AND gate 136 in the AOI gate 134 are the BP<0>* and BP<1>* signals, which are true to indicate a value of 000 or 100 for the counter 100. The inputs to the other AND gate 138 in the AOI gate 134 are the BP<0>* signal and the SA<4>* signal. The SA<4>* signal is the address bit on the intermediate address bus SA corresponding to the 1 in the extended function port addresses of 18 and 1A. This signal is high during all operations where the master latches 102, 104 and 106 are enabled except during extended function port operations. The output of AND gate 138 is true when an extended address operation is not occurring, that is when a direct operation is being performed to the conventional DMA addresses, and when the BP<0>* signal is high. Therefore, the combinatorial logic provided by the AND gates 132 and 134 is such that the least significant bit of the counter 100 advances as indicated in the counting sequence.

The D input to the middle bit master latch 104 is the BP<0> signal. The D input to the most significant master latch 102 is the BYTE2 signal. Thus, the counter 100 is configured to count as previously described, depending upon whether the extended function registers are active or being addressed.

Figure 2:
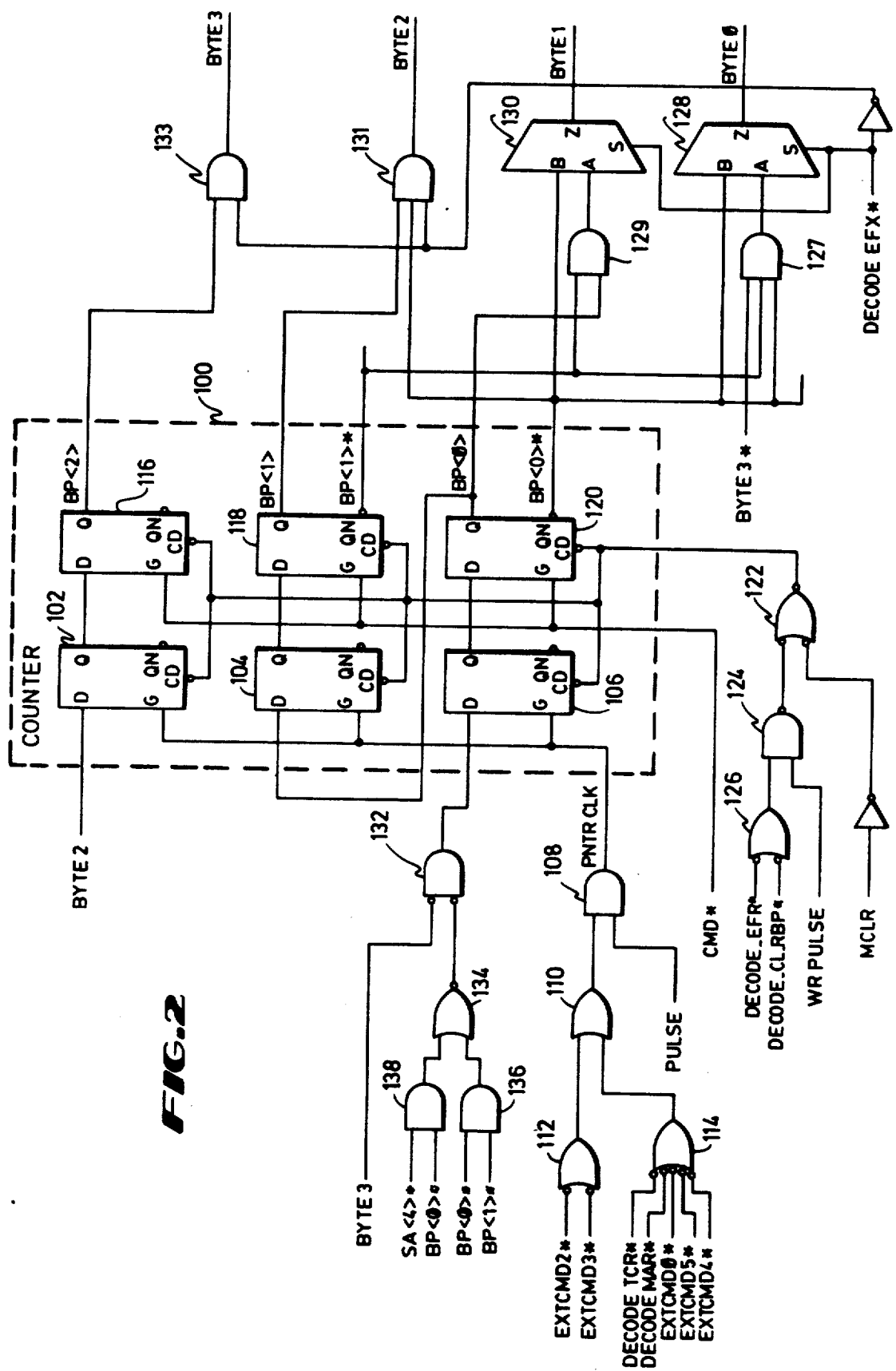

Therefore, the pointer logic in FIG. 2 provides an indication as to which byte of the various registers is actually being referenced. The four BYTE signals, in combination with the appropriate intermediate address bus SA signals and the system control bus UC write or read control signals, are used to read or write the memory address values on the intermediate data bus SD into the various internal memory locations used to actually store the various values contained in the DMA controller 34. The logic for performing the storage and gating is not shown.

To insure full compatibility with DMA operations as defined in the MCA and as implemented in computer systems, it is necessary to also properly support 24 bit DMA addresses as they exist in the MCA implementations. This requires that the DMA controller 34 understand when only three bytes of the memory address have been programmed, in deference to instances where the full 32 bit address has been programmed.

Figure 3:
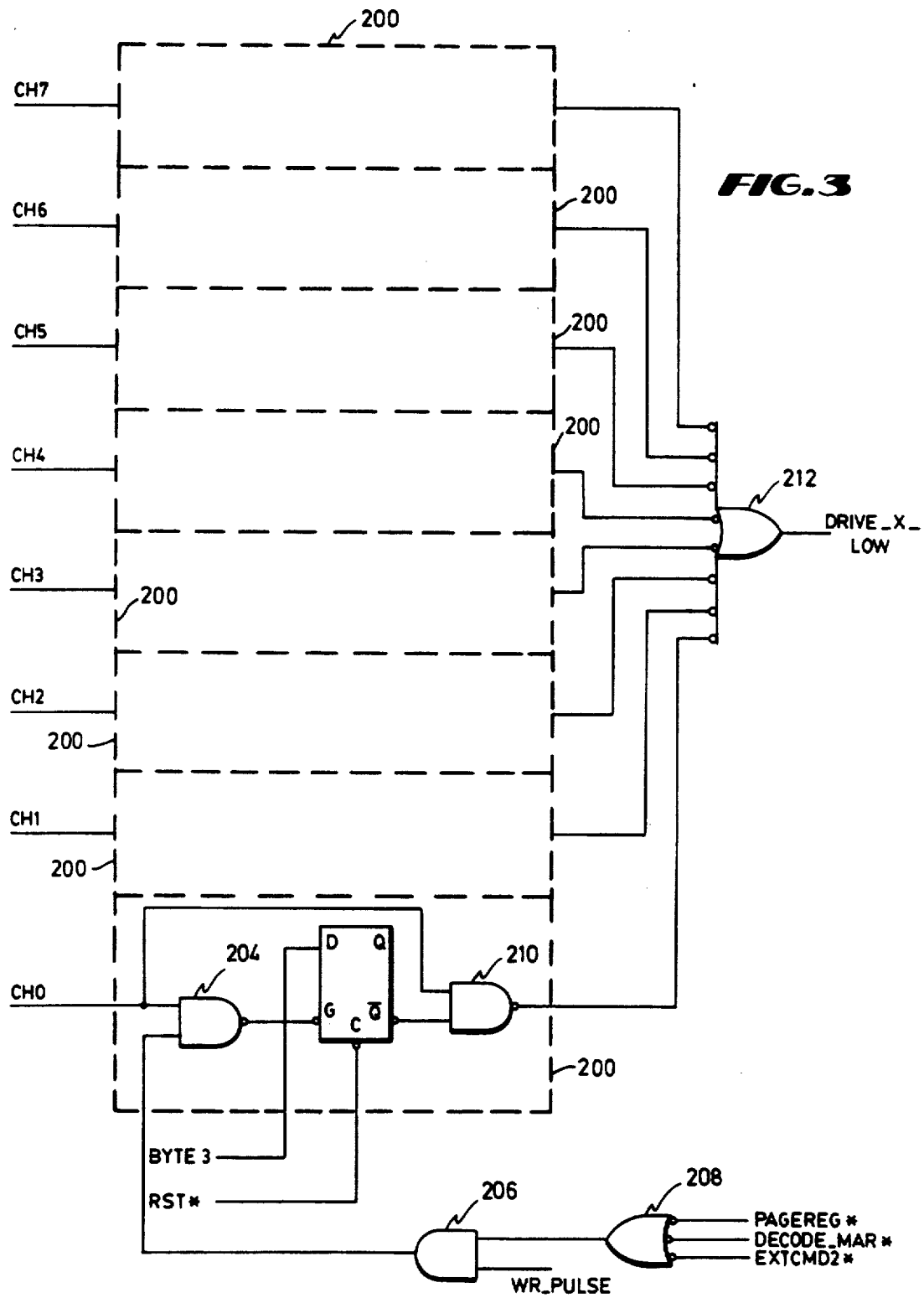

Because only one byte counter 100 is used in the DMA controller 34 and the pointer value thus changes with each access to a different channel, memory address register or transfer count register, the number of memory address bytes programmed into each channel must be stored. This storage is done in an extended byte storage module 200 (FIG. 3). Because the DMA controller 34 of the preferred embodiment contains 8 channels, there are 8 identical modules 200, the only difference in the modules 200 being the channel indicator signal entering the module 200. Therefore only one module is shown in detail in FIG. 3 for reasons of clarity. The storage element in the module 200 is a D-type low enable latch 202. The D input of the latch 202 is connected to the BYTE3 signal and the clear input is connected to the RST* signal, the general reset signal for the computer system C. The enabling or gating input of the latch 202 is inverted and is connected to the output of a two input NAND gate 204. One input to this NAND gate 204 is a signal referred to as CHn, the n representing the particular channel number. This is a channel indication signal which is used to determine which particular channel in the DMA controller 34 is being accessed, either based on the I/O port address, if conventional programming is being done, or the channel number indicated by the extended function register during extended function operations. The other input to the NAND gate 204 is provided from the output of an AND gate 206. The AND gate 206 has two inputs, one the WR_PULSE signal previously described and the other the output of a three input NAND gate 208. The three input NAND gate 208 has inputs of the PAGE-REG* signal, the DECODE_MAR* signal, and the EXTCMD2* signals. These three signals, respectively, indicate that an access is being made to the page register or memory address register under conventional techniques or that a memory address write operation is being performed through the extended function capabilities. Thus, operation of the module 200 is such that the BYTE3 signal state is latched every time a write operation for the appropriate channel is performed to the registers associated with a memory address. Because the BYTE3 signal only goes high on the fourth write to the extended function execution port, during all other cases a value of 0 or a low is latched into the latch 202, which indicates that the high or fourth byte has not been programmed and that 24 bit operation is to be performed. On the fourth access under the extended function mode, the BYTE3 signal is high and so this value is latched in the latch 202.

The inverted output of the latch 202 is provided to one input of a two input NAND gate 210, with the other input being the CHn signal. The output from the NAND gate 210 for each module 200 is provided as an input to an 8 input NAND gate 212. The output of the NAND gate 212 is the DRIVE_X_LOW signal, which indicates that the DMA controller 34 is operating with a 24 bit memory address for that particular channel, that a zero output is to be provided on the extended or top byte on the intermediate address bus SA and that the extended byte of the system address bus UA should not be driven, thus allowing a float condition. Thus the combination of the modules 200 and the NAND gate 212 provide an indication when the DMA controller 34 is operating in 24 bit memory address mode for a particular channel.

Figure 4:
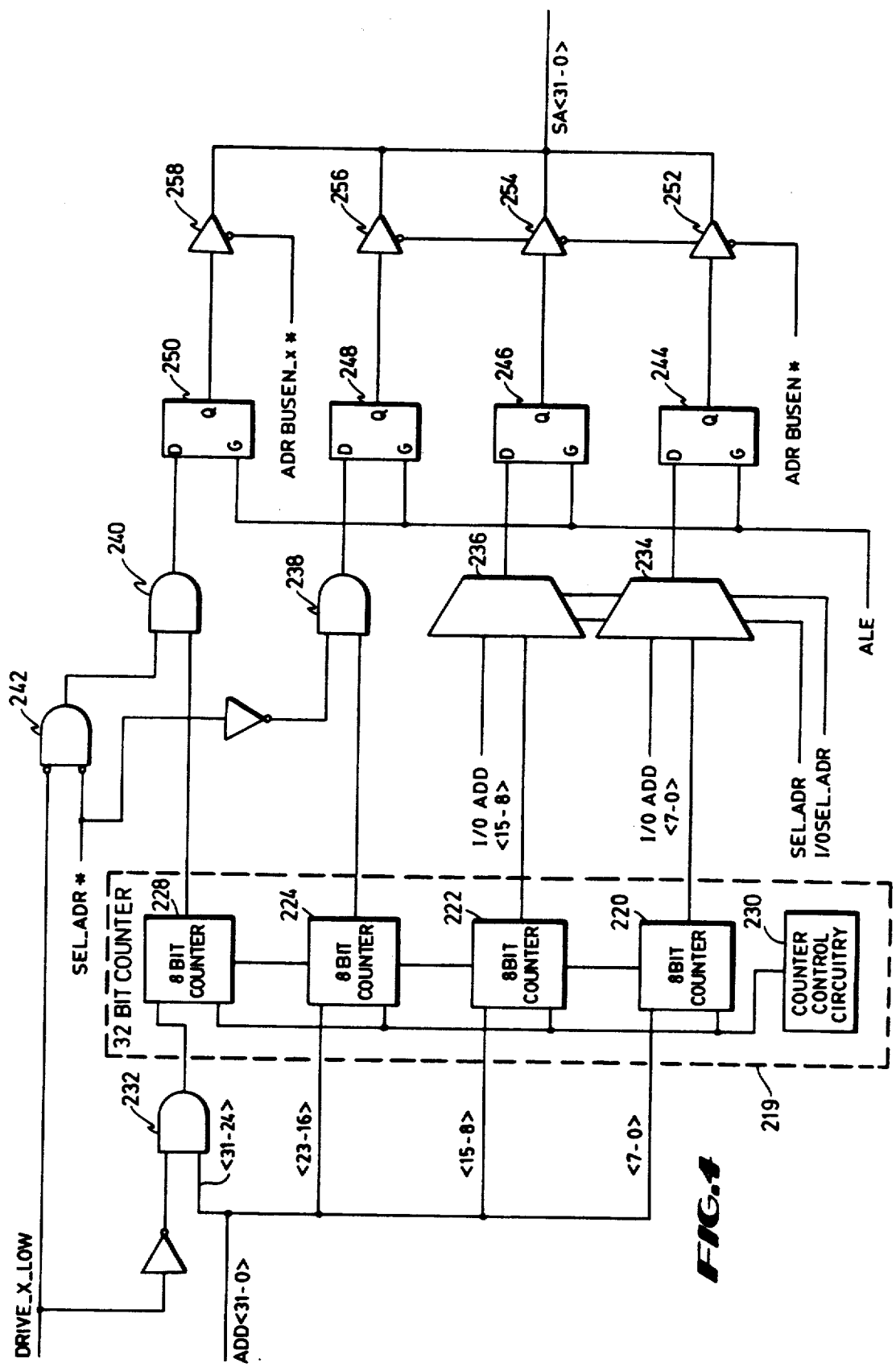

The address output circuitry for the DMA controller 34 is generally shown in FIG. 4. The address output circuitry is based on a 32 bit counter 219 comprising four individual 8 bit counters 220, 222, 224 and 228. These individual counters 220, 222, 224 and 228 are connected to counter control circuitry 230 which provides the proper signals at appropriate times for loading and incrementing and indicates whether the counter 219 is to increment by one or two, depending on whether the particular DMA channel is operating in byte or word mode. If the counter 219 is operating in byte mode, the counter 219 increments by one, whereas if it is operating in word mode, it increments by two. The parallel load inputs to the lower three individual counters 220, 222 and 224 are the respective 8 bits of the address value provided from the address memory (not shown) contained in the DMA controller 34. The upper 8 bits of the address value are provided to one input of a two input AND gate set 232. The other input to the AND gate set 232 is an inverted DRIVE_X_LOW signal. Thus, if the particular channel is programmed for 24 bit memory address operation, the top or extended byte individual counter 228 is loaded with a zero value for proper operation of the DMA controller 34 and the cache controller 22.

The outputs of the lower two individual counters 220 and 222 are provided to the inputs of one channel of two 2:1 multiplexers 234 and 236. Because the DMA controller 34 must also provide I/O port addresses according to the MCA in certain cases, the lower 16 bits of the address, which are provided to the intermediate address bus SA, are multiplexed with the I/O address counter circuitry (not shown). Therefore, the other inputs to the 2:1 multiplexers 234 and 236 are the appropriate bits of the I/O port address. The selection of which of the two input channels to use is determined based on the conditions of the SEL_ADR signal and the I/OSEL_ADR signal, which are provided to the multiplexers 234 and 236. If the SEL_ADR signal is high, the memory address signals coming from the counters 220 and 222 are used and routed to the output of the multiplexers 234 and 236, while if the I/OSEL_ADR signal is high, the I/O address values are routed to the outputs. The SEL_ADR and I/O SEL_ADR signals are never high concurrently and can go high only when the DMA controller 34 is controlling the system bus U.

The upper 16 bits of the memory address provided from the DMA controller 34 do not need to be multiplexed, but only need to be made zero during I/O address generation or the appropriate value during memory address generation. Therefore, the output signals from the upper two individual counters 224 and 228 are provided as inputs to AND gate blocks 238 and 240. The second input of the AND gate block 238 is the SEL_ADR signal, so that when a memory address is being developed, as indicated by the SEL_ADR signal being high, the AND gate block 238 is activated and the state of the counter 224 is passed through, while if an I/O address is present, the SEL_ADR signal is low and therefore zeros are output from the AND gate block 238. The second inputs to the AND gate block 240 are provided by the output of a NOR gate 242. One input to the NOR gate 242 is the DRIVE_X_LOW signal and the other input is the SEL_ADR* signal, the inversion of the SEL_ADR signal. The output of the NOR gate 242 is low if either the DRIVE_X_LOW signal is low, indicating a 24 bit memory address operation or the SEL_ADR signal is low, indicating that it is not a memory address portion of the DMA cycle in operation. The use of the DRIVE_X_LOW signal here as well as at the input to the individual counter 228 is to guarantee that even if the counter 219 increments such that a 1 value is present in individual counter 228 because of the counter increment, the output memory address is still zero and the counter 219 is effectively acting in pseudo 24 bit mode, even though it is a full 32 bit counter.

The outputs of the multiplexers 234 and 236 and of the AND gate blocks 238 and 240 are provided to four 8 bit latches 244, 246, 248 and 250. The enabling or gating signal to the latches 244, 246, 248 and 250 is the ALE signal. This signal has appropriate timing so that it appears when the addresses are properly present at the inputs to the latches 244, 246, 248 and 250 and DMA address operations are occurring. The outputs of the latches 244, 246, 248 and 250 are provided to output buffers 252, 254, 256 and 258. The lower three buffers 252, 254 and 256 have their output enable inputs connected to the ADRBUSEN* signal, a signal which indicates that the DMA controller 34 should properly be driving an address signal onto the intermediate address bus SA. The extended or fourth buffer 258 has its output enable input connected to the ADRBUSEN_X* signal, which indicates if the DMA controller 34 is to drive the high address byte based on whether a 24 bit address or 32 bit address is present in the DMA controller 34 or an external bus master using only 24 bit addresses is controlling the system. The latches 244, 246, 248 and 250 are transparent so that when the ALE signal is high the value present at their input is provided to their outputs. The ALE signal is high during the appropriate period when the DMA controller is providing addresses to the intermediate address bus SA, such as when the DMA controller 34 is actually in control of the system or when an external 24 bit bus master is in control of the system and therefore the upper address byte needs to be driven on the intermediate address bus SA.

The DMA controller 34 must generate the ADRBUSEN*, ADRBUSEN_X* and EXCY16 signals to properly drive the output buffers of the DMA controller 34 and the transceiver 37 between the intermediate address bus SA and the system address bus UA. The ADRBUSEN* signal is the inverse of the OR of the DMA 1 and RFN signals as generated by an OR gate 270 (FIG. 5). The DMA 1 signal indicates that a DMA operation is in process and the RFN signal indicates that a refresh operation is in process. In the preferred embodiment, the DMA controller 34 is used to control refresh addresses necessary to allow the dynamic random access memories commonly used in the computer system C to maintain their data. The remaining portions of the refresh circuitry are not shown for clarity reasons.

The output of the OR gate 270 is also provided as one input to a two input NOR gate 272. The output of the NOR gate 272 is the ADRBUSEN_X* signal, which is used to drive the extended byte buffer 258. The second input to the NOR gate 272 is a signal which indicates that an external bus master is in control of the system bus U and that it is a bus master which only generates 24 bit addresses. This signal is developed by an AND gate 274, which has input signals of the MADE24 signal, according to the MCA, and an EBM signal, which indicates that an external bus master is in control. The EBM signal is the inverse of the EBM* signal, which is generated by a three input NAND gate 276. The inputs to the NAND gate 276 are the DMA 1* signal, the GRANT signal and the HLDA signal. The GRANT and HLDA signals, respectively, indicate that access or control of the system bus U has been granted to a party and that the microprocessor 20 and/or the cache controller 22 has acknowledged that it is in held state and therefore not in control of the bus. Therefore, this combination of not being a DMA cycle, control being granted to a party and the processor or processor bus devices not being that party indicates that an external bus master is in control of the system bus U. Thus the ADRBUSEN_X* signal is low whenever a DMA operation is occurring or a 24 bit address bus master is controlling the system bus U. If a 32 bit DMA operation is occurring, the proper address value is supplied to the intermediate address bus SA. In the other cases where the ADRBUSEN_X* signal is low the extended byte of the intermediate address bus SA is driven with zeroes by the buffer 258. The ALE signal is high during the proper address interval and the output of the NOR gate 242 is low, so that the extended latch 250 is passing zero values through to the intermediate address bus SA during 24 bit DMA or bus master operations, thus insuring cache coherency.

The output of the AND gate 274 is also used with the remaining circuitry in FIG. 5, which circuitry indicates and determines when the the extended address transceiver 37 is to be enabled or disabled. The circuitry is utilized to properly time the disabling of the transceiver 37 and thus to eliminate any bus contention problems which might occur between the DMA controller 34 and the transceiver 37.

The EXCY16 signal, which is connected to the enable input of the transceiver 37, is produced by the output of a two input NAND gate 278. One input to the NAND gate 278 is the output of a NAND gate 280 which has respective inputs of the DRIVE_X_LOW signal and the DMA 1 signal. Thus, if the DMA controller 34 is operational in a DMA cycle and the channel being utilized is in 24 bit address mode, then the EXCY16 signal is high so that no address is supplied to the system address bus UA and the system address bus US is floated. If the DMA controller 34 is in operation and a 32 bit address is being presented, the EXCY16 signal is low, the transceiver 37 is enabled and all 32 address values are presented to the system address bus UA.

Figure 6:
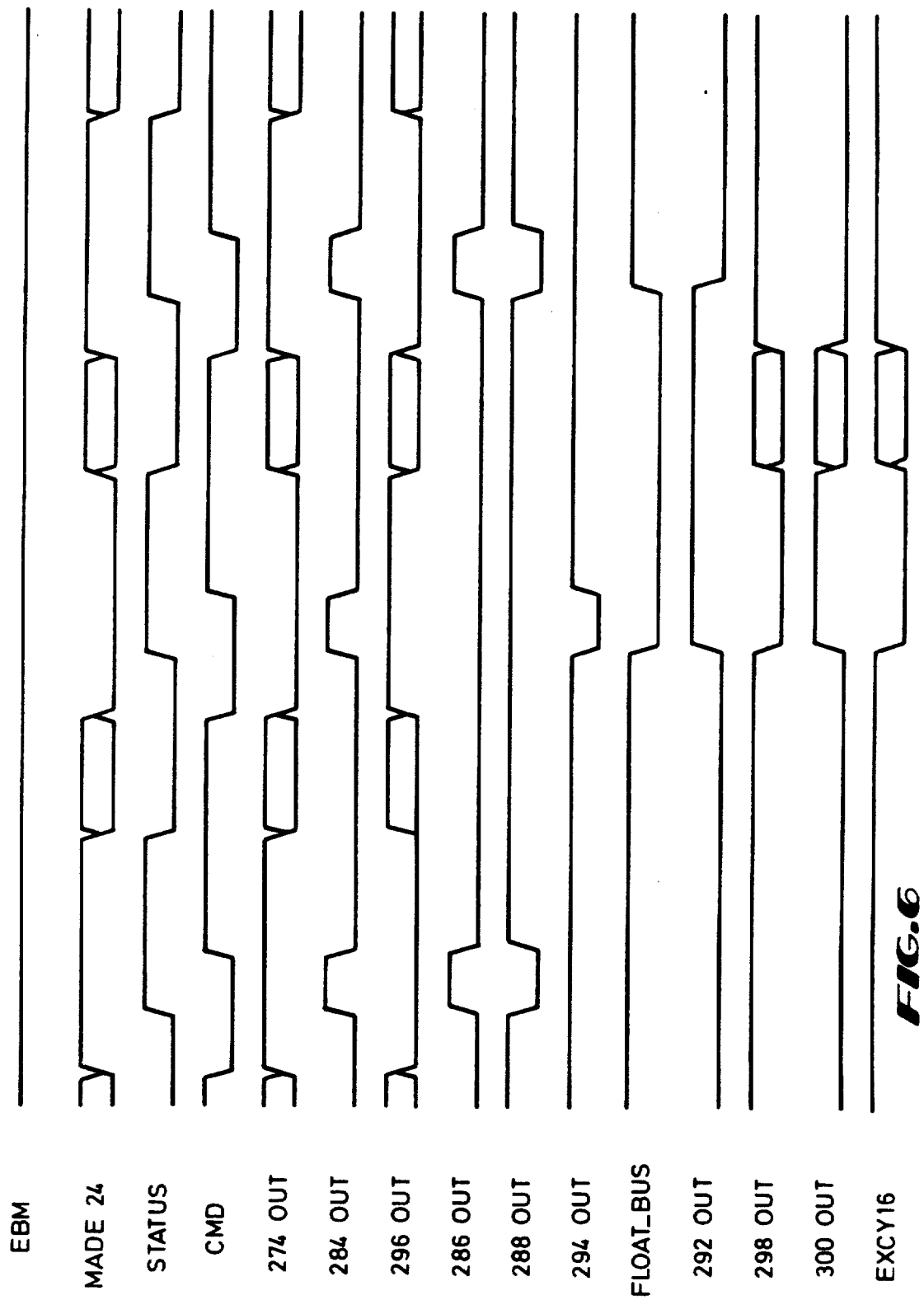
FIG. 6 is a timing diagram of portions of the circuitry of FIG. 5.

The more difficult condition is the interfacing with the external bus master. Shown in FIG. 6 are appropriate wave forms portions of the circuit of FIG. 5. The EBM signal, the MADE24 signal, the STATUS signal and the CMD signal wave forms are shown and form the basis of the other signals shown. The output of the NAND gate 280 is not shown because in the wave form illustrated it is assumed that DMA operation is not taking place and therefore the signal is always high, the NAND gate 278 acting as an inverter. The CMD signal, a signal that is essentially the MCA CMD* signal inverted, is applied to an inverter 282. The output of the inverter 282 is provided to one input of a two input AND gate 284. The other input to the AND gate 284 is a signal which is the XOR of the S0* and S1* signals which appear in the control lines of the system control bus UC. The definition of the S0* and S1* signals are such that if they are the same there is no status appearing on the system control bus UC or an interrupt operation is in process, neither of which are relevant to external bus master address line driving. The output of the AND gate 284 is thus a pulse which appears during the overlap of the status lines and the CMD signal. The output of the AND gate 284 is provided to one input of an AND gate 286, the other input being the output of the AND gate 274. The output of the AND gate 286 is a pulse having the timing of the output of the AND gate 284 and which appears when a 24 bit address external bus master is utilizing and has control of the system bus U.

The output of the AND gate 286 is provided to one input of a two input NOR gate 288. The second input to the NOR gate 288 is the EBM* signal provided from the NAND gate 276. The output of the NOR gate 288 is provided to one input of a two input NAND gate 290, which in turn is connected with a second two input NAND gate 292 to form an R-S flip-flop. The output of the NAND gate 290 is the FLOAT_BUS signal and is coupled to one input of the two input NAND gate 292, whose output is connected to the second input of NAND gate 290. The output of the NOR gate 288 is a low pulse whenever the external bus master or DMA operation is a 24 bit operation. This pulse is used to set the state of the NAND gates 290 and 292 so that the FLOAT_BUS signal goes high when a 24 bit master or DMA operation is occurring.

The second input of the NAND gate 292 is connected to the output of a two input NAND gate 294. The inputs to the NAND gate 294 are the outputs of the AND gate 284 and of a two input NOR gate 296. The inputs to the two input NOR gate 296 are the EBM* signal and the MADE24 signal. Therefore, for the conditions of interest, the output of two NOR gate 296 is essentially the inverse of the MADE24 signal and the output of the two input NAND gate 294 is a low pulse whenever the external bus master is a 32 bit address driving bus master. This pulse output from NAND gate 294 is used to change the state of the flip-flop formed by NAND gates 290 and 292 so that the FLOAT_BUS signal goes low when a 32 bit master is driving the system bus U.

The FLOAT_BUS signal is connected to one input of a two input OR gate 298, whose other input is the output of the AND gate 274. The output of the OR gate 298 is connected to one input of a two input NAND gate 300, whose other input is the EBM signal. The output of the NAND gate 300 is connected to the second input of the two input NAND gate 278 which produces the EXCY16 signal. Therefore, for the wave forms shown in FIG. 6 which are illustrative of the operation of this circuitry, the EXCY16 signal is high when a 24 bit address bus master is controlling the cycle and remains high a short interval after the 32 bit address bus master takes control. Then during the appropriate portion of the cycle, the EXCY16 signal is low, thus enabling the extended byte transceiver 37 to pass the address information to the intermediate address bus SA and thus allow the cache controller 22 to properly snoop the addresses to maintain cache coherency. The state of the EXCY16 signal then tracks the changes of the MADE24 signal until the MADE24 signal is valid, indicating a 24 bit address bus master is in operation, at which time the EXCY16 signal remains high, disabling the transceiver 37.

Therefore the operation of the circuit shown in FIG. 5 results in the DMA controller 34 properly driving a zero value onto the top eight lines of the intermediate address bus SA whenever the DMA controller 34 is providing a 24 bit address or when an external bus master having a 24 bit address is in operation and controls the system bus U, and yet allows proper operation with a full 32 bit address bus master without a conflict of the bus drivers on the intermediate address bus SA.

The DMA controller 34 according to the present invention also allows the capability to transfer data on a word basis to or from an odd starting memory address from or to an even starting I/O port. For example, if the memory bytes are determined to have byte 0 at an even or 0 address least significant bit and byte 1 at an odd address least significant bit (FIG. 7A), and the following byte designation numbers increasing in like sequence, and it is desired that the byte values 1 and 2 be transferred to an even word boundary in the I/O space, for example, byte 1 transferred to an I/O port least significant bit of 0 and byte 2 to an I/O port least significant bit of 1 (FIG. 7B) this is referred to as an odd aligned transfer.

As indicated in the description of the prior art, prior computer systems do not allow this operation to be performed efficiently. The units known according to the prior art obtained the data from the memory or wrote the data to the memory one byte at a time and did the transfer to or from the I/O space one word at a time. This results in operation sequences for DMA read and DMA write operations as shown in FIGS. 8A and 8B. The prior art devices required three complete operation cycles to perform a single full transfer. The present invention performs a DMA read operation as shown in the second line in FIG. 8A, wherein the memory locations containing bytes 0 and 1 are read and the data of byte 1 appropriately stored. Following this, bytes 2 and 3 are read and stored, which operation is followed by an I/O write of bytes 1 and 2. Bytes 4 and 5 are then read from the memory and bytes 3 and 4 are written to the I/O space. In the final steps of the illustrated sequence, bytes 6 and 7 are read from the memory and bytes 5 and 6 are written to the I/O space to complete the transfer. Alternately, only byte 6 need be read from the memory and bytes 5 and 6 written to the I/O space to complete the transfer. Therefore it is seen that this complete operation is done in two cycles less than the prior art or in a time of $2n+1$ cycles, where n is the number of words to be transferred, the efficiency advantage increasing as the length of the continuous transfer block increases.

A DMA write operation according to the present invention, is performed as shown in FIG. 8B. The first two bytes 1 and 2 are obtained from the I/O space in the first operation and stored and byte 1 is written to the memory in a byte write operation as next step. Following this, bytes 3 and 4 are obtained from the I/O space and stored and then bytes 2 and 3 are written to the memory location. Following this, the I/O space is accessed for bytes 5 and 6, which are then stored, and bytes 4 and 5 are written to the memory. In the final step a byte operation is performed by writing byte 6 to the memory. Again, it can be seen that this operating sequence saves two cycles for a three word transfer as compared to the equivalent transfer of the prior art. Once again, as the length of the transfer block increases, the efficiency gain increases because the same $2n+1$ formula applies.

Figure 9:
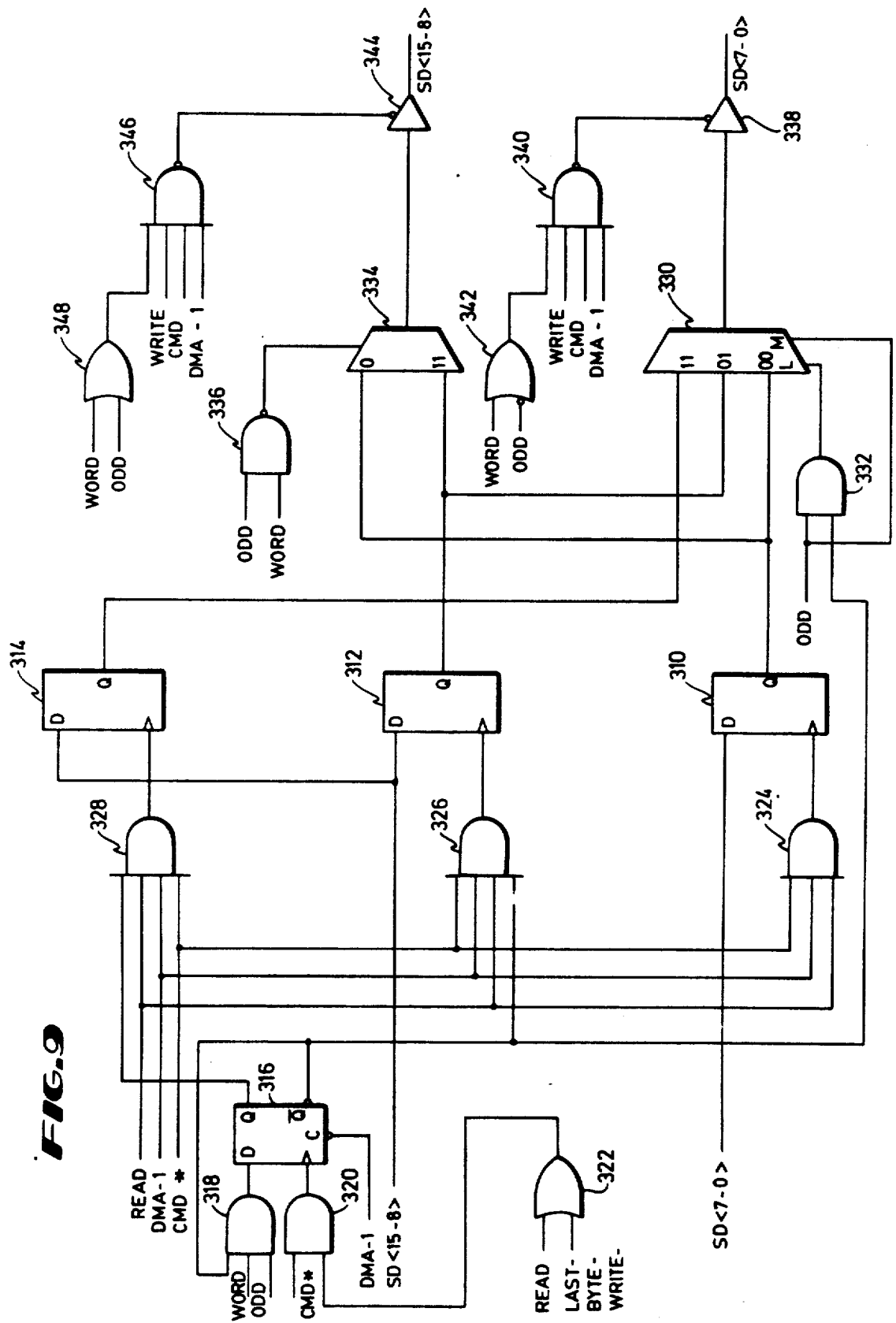
FIGS. 9, 10 and 11 are schematic circuit diagrams of portions of the circuitry of a DMA controller incorporating the present invention for performing odd memory boundary word transfers.
Figure 10:
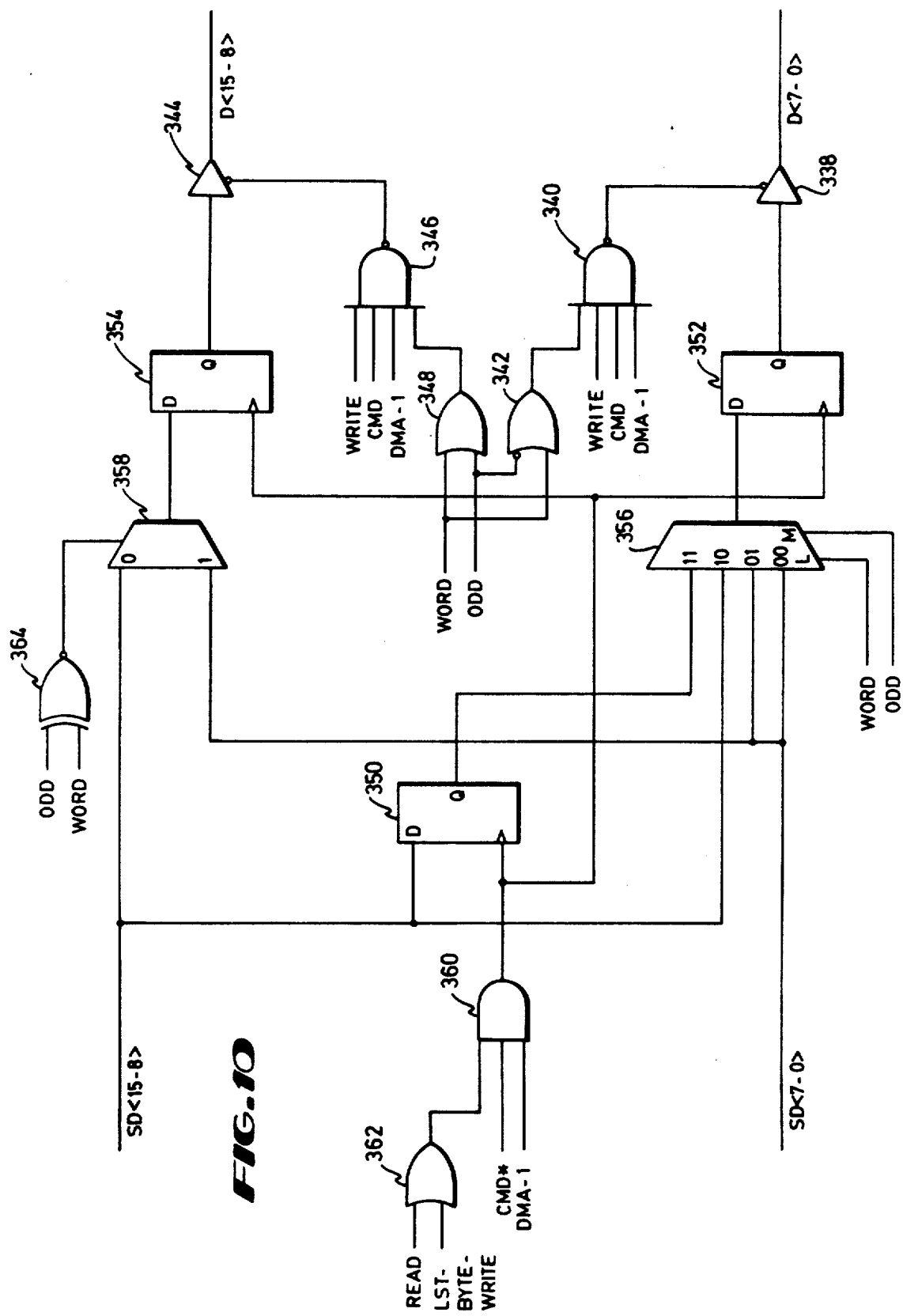
Figure 11:
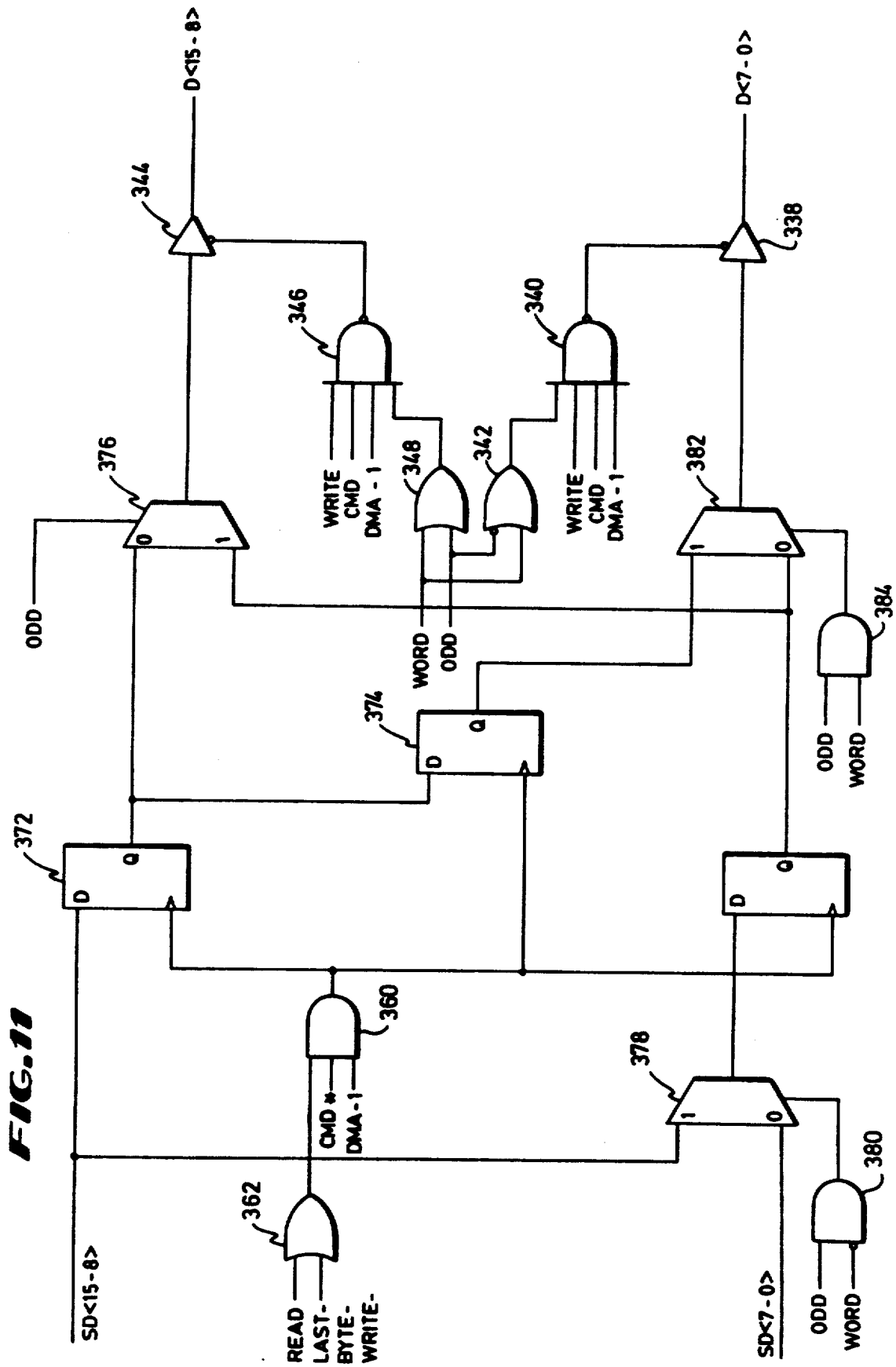

Three alternative circuits for performing these operations are shown in FIGS. 9, 10 and 11. The circuits perform similar operations but have differing locations for the various latches and multiplexers used to perform the storing and gating functions.

The first embodiment is shown in FIG. 9, which has three 8 bit positive edge triggered flip-flops 310, 312 and 314. The low byte flip-flop 310 is used for storing the incoming 8 data values from the SD<7-0> lines. The two high byte flip-flops 312 and 314 are used to store information received on the high byte or SD<15-8> lines. Use of two flip-flops 312 and 314 is required because one high byte value must be temporarily stored while assembling the word for translation and output to the I/O port or memory as necessary. The control as to whether the primary flip-flop 312 or the alternative flip-flop 314 is utilized is determined based on the state of a byte storage D-type flip-flop 316. The byte storage flip-flop 16 is cleared whenever the DMA_1 signal is low, with the clear signal removed when the DMA_1 signal goes high. Thus, the byte storage flip-flop 316 always starts with a zero output level on the noninverting output to commence operations. The inverted output of the byte storage flip-flop 316 is fed back as one input to a three input AND gate 318, whose output is provided to the D input of the byte storage flip-flop 316. The other two inputs to the AND gate 318 are a WORD signal and an ODD signal which represent respectively, that a word transfer is to occur and that the transfer is to utilize odd memory boundaries. These signals are provided by other logic in the DMA controller 34 which interprets the various registers and memory addresses stored in the DMA controller 34 based on commands provided by the microprocessor 20 and determines the state of the DMA controller 34. Thus, if only even addresses are to be used in the transfer or bytes are to be transferred, the state of the byte storage flip-flop 316 does not change but remains constantly at zero. If, however, an odd boundary word transfer is to occur, the connection of the inverting output to the AND gate 318 results in the byte storage flip-flop 316 toggling its state during the process.

The byte storage flip-flop 316 is clocked by a signal provided by a two input AND gate 320. One input to this AND gate 220 is the CMD* signal available on the system control bus UC. The other input to the AND gate 320 is provided by the output of an OR gate 322, whose inputs are a READ signal or a LAST_BYTE_WRITE signal. The READ signal indicates that the read portion of a DMA operation is occurring. The LAST_BYTE_WRITE signal indicates that this latching is in preparation for the transfer of the last byte in a DMA write operation, as exemplified by the memory 6 operation in FIG. 8B. The READ and LAST_BYTE_WRITE signals are also produced by circuitry associated with the state machine used in the DMA controller 34.

The clock inputs of the flip-flops 310, 312 and 314 are driven by the outputs of three AND gates 324, 326 and 328. Each of the AND gates has as input signals the READ signal, the DMA_1 signal, and the CMD* signal. The AND gates 326 and 328 associated with the high bytes flip-flops 312 and 314 have one additional input each. The AND gate 326 associated with the primary flip-flop 312 has as its fourth input the inverted output of the byte storage flip-flop 316, while the AND gate 328 associated with the alternate flip-flop 314 has as its fourth input the non-inverted output of the byte storage flip-flop 316. Therefore, with this configuration of inputs to the AND gates 324, 326 and 328, the low byte flip-flop 310 is clocked at each read operation while the flip-flops 312 and 314 alternately receive the signals present on the SD<15-8> line, thus allowing the information to be temporarily stored and not overwritten, as is the case of that information present on the lower byte data lines. If only bytes are being transferred or words are being transferred on even addresses, only flip-flops 310 and 312 are utilized in the data transfer. It is to be noted that the data present on the data lines to the flip-flops 310, 312 and 314 is controlled by other portions (not shown) of the DMA controller 34 based on whether this is a DMA read or DMA write operation.

The outputs of all three flip-flops 310, 312 and 314 are provided to an 8 bit wide low byte multiplexer 330. The outputs of the low byte flip-flop 310 are provided to the 00 inputs of the 4:1 multiplexer 330, while the outputs of the primary flip-flop 312 are provided to the 01 inputs and the outputs from the alternate flip-flop 314 are provided to the 11 inputs. No connection need be made to the 10 inputs of the low byte multiplexer 330.

Gating selection for the least significant bit of the two bits used for gating the low byte multiplexer 330 is provided by the output of an AND gate 332. The inputs to the AND gate 332 are the ODD signal and the inverted output of the byte storage flip-flop 316. The most significant bit in the selection encoding is connected to the ODD signal. This encoding scheme allows selection from the flip-flops 310, 312 and 314 as appropriate.

The output of flip-flops 310 and 312 are provided to the input of an 8 bit wide 2:1 high byte multiplexer 334. The outputs of t-he flip-flop 310 are provided to the 0 inputs, while the outputs of the flip-flop 312 are provided to the 1 inputs. Selection for the high byte multiplexer 334 is determined by the output of a two input NAND gate 336 whose inputs are the ODD signal and the WORD signal.

As an example, in a DMA read operation in the initial read cycle, a high or odd byte, byte 1, is stored in the primary flip-flop 312. A read cycle occurs again and the high byte, byte 3, is stored in the alternative flip-flop 14 while the low byte is stored in the low byte flip-flop 10. For the first write cycle in the odd word transfer, the information contained in the low byte flip-flop 310 is provided through the high byte multiplexer 334 and the information contained in the primary flip-flop 312 is provided through the low byte multiplexer 330. The next read cycle stores the data in flip-flops 310 and 312. After the next read cycle has occurred a second write cycle occurs. In this second write cycle, the data from the low byte flip-flop 310 is again provided through the high byte multiplexer 334, while the data contained in the alternate flip-flop 314 is provided through the low byte multiplexer 330. The next read cycle stores the data in flip-flops 310 and 314. In the next write cycle, the data provided by the low byte multiplexer 330 will be that contained in the primary flip-flop 312. This alternating sequence of the use of primary and alternate flip-flops 12 and 314 continues until the operation is completed.

The output from the low byte multiplexer 330 is provided through a low byte buffer 338 to the low byte of the intermediate data bus SD. Enabling of the low byte buffer 338 is provided by the output of a four input NAND gate 340. Three of the inputs to this NAND gate 340 are the WRITE signal, the CMD signal and the DMA_1 signal. The WRITE signal is the complement of the READ signal. The fourth input signal to the NAND gate 340 is provided by the output of an OR gate 342. One input to the OR gate 342 is the WORD signal while the other input to OR gate 342 is the inverted ODD signal. Thus the low byte buffer 338 is enabled for operation whenever even addresses are present during a write pulse or whenever word information has to be written to the appropriate locations. A high byte buffer 342 is connected to allow the high byte multiplexer 334 to pass its data to the SD<15-8> lines. The enable input of the high byte buffer 344 is connected to the output of a four input NAND gate 346. Three input signals to the four input NAND gate 346 are the WRITE signal, the CMD signal and the DMA_1 signal. The fourth input is provided by the output of a two input OR gate 348 whose inputs are the WORD signal and ODD signal. Therefore, the high byte buffer 344 is enabled during DMA write operations during the CMD interval for word operations or when an odd address is present.

A first alternative version of the latching and gating circuitry is shown in FIG. 10. Again, three 8 bit positive edge triggered flip-flops are utilized but in this case flip-flops 350, 352 and 354 are configured differently with respect to the low byte multiplexer 356 and the high byte multiplexer 358. In this design, the SD<15-8> lines are connected to the D input of a transfer flip-flop 350, to the 0 inputs of a high byte multiplexer 358, and to the 10 inputs of a low byte multiplexer 356. The low byte of the data lines, the SD<7-0> lines, are connected to the 1 channel inputs of the high byte multiplexer 358 and to the 00 and 01 inputs of the low byte 4:1 multiplexer 356. The outputs of the transfer flip-flop 350 are connected to the 11 inputs of the low byte multiplexer 356. The output of the low byte multiplexer 356 is connected to the D inputs of the low byte flip-flop 352, while the outputs of the high byte multiplexer 358 are connected to the D inputs of the high byte flip-flop 354. The clocking signal for the three flip-flops 350, 352 and 354 is provided by the output signal of a three input AND gate 360. Two of the inputs to this three input AND gate 360 are the CMD* signal and the DMA_1 signal. The third input is the output of a two input OR gate 362 whose inputs are the READ signals and LAST_BYTE_WRITE signal. Thus, positive edges are developed during each read operation or for the final byte write operation to properly allow the data be transferred through the flip-flops 350, 352 and 354.

The high byte multiplexer 358 selection is provided by the output of an EQUAL circuit 364 whose inputs are the ODD signal and the WORD signal. Therefore, if odd word or even byte operation is occurring, the low data lines SD<7:0> are gated through the high byte multiplexer 358 while if an odd byte or even word operation is occurring, the SD<15-8> lines are gated through the high byte multiplexer 358. The lower significant bit used for the selection of the appropriate channel for the low byte multiplexer 356 is connected to the WORD signal, while the more significant bit is connected to the ODD signal. Thus, during any even transfer, the low byte of the data lines is passed through the low byte multiplexer 356. If an odd address is present, the WORD signal provides the data selection so that if a word transfer operation is also occurring, the data contained in the transfer flip-flop 350 is passed through the low byte multiplexer 356. While a byte operation is occurring, the values on the SD<15-8> lines are routed through the low byte multiplexer 356.

The low byte flip-flop 352 has its outputs connected to the low byte buffer 338 while the high byte flip-flop 354 has its outputs connected to the high byte buffer 344. Operation of the low and high byte buffers 338 and 344 is as previously described. In the operation of this embodiment in odd boundary word transfer mode, the high byte data values are delayed one read cycle by use of the transfer flip-flop 350. In all other operations data passes through the appropriate multiplexers and flip-flops without this temporary delay.

A second alternative circuit design is shown in FIG. 11 which requires only the use of 2:1 multiplexers and does not require the 3 or 4 to 1 multiplexers as in the previous designs. Again, three 8 bit positive edge triggered flip-flops 370, 372 and 374 are utilized and are clocked by the output of the AND gate 360. The high byte flip-flop 372 has as its inputs connected to the SD<15-8>lines. The outputs of the high byte flip-flop 372 are provided to the 1 inputs of a high byte multiplexer 374 and to the D inputs of the transfer flip-flop 374. The SD<15-8> lines are also provided to the 1 inputs of a L±5 first low byte multiplexer 378. The low byte or SD<7-0>lines are provided to the 0 inputs of the first low byte multiplexer 378. The selection input of the first low byte multiplexer 378 is connected to the output of a two input AND gate 380 whose inputs are the ODD signal and an inverted WORD signal. Thus, if an odd byte transfer is occurring, the data from the SD<15-8> lines are transferred to the low byte flip-flop 370 for storage and transmission. Under all other cases, the low byte of the data lines is passed through the first low byte multiplexer 378.

The outputs of the low byte flip-flop 370 are provided to the 0 input of a second low byte multiplexer 382. The 1 inputs to the second low byte multiplexer 382 are connected to the outputs of the transfer flip-flop 374. The selection control is provided by the output of a two input AND gate 384 whose inputs are the ODD signal and the WORD signal so that if an odd word transfer is occurring, the information contained in the transfer flip-flop 374 is passed through the multiplexer 382 while in all other cases the values present at low byte flip-flop 370 is transferred through the second low byte multiplexer 382. The outputs of the low byte flip-flop 370 are also connected to the 1 inputs of a high byte multiplexer 376, while the outputs of the high byte flip-flop 372 are connected to the 0 inputs of the high byte multiplexer 376. The selection or gating information for the high byte multiplexer 376 is provided by the connection of the ODD signal. The output of the second low byte multiplexer 382 is connected to the low byte buffer 338 while the output of the high byte multiplexer 376 is connected to the high byte buffer 344. The operation of the buffers 338 and 344 is as in the previous examples.

Therefore, a DMA controller according to the present invention allows the use of 32 bit memory addresses, if desired, but also allows the use of 24 bit memory addresses to remain compatible with the prior art equipment developed for use with the MCA. In addition, the DMA controller according to the present invention provides proper operation when a cache controller is utilized in the computer system and is compatible with the prior art MCA systems by properly ensuring that the high byte of the 32 bit address which is snooped by the cache controller is valid at all times as necessary. Finally, the DMA controller according to the present invention allows for odd memory address word transfers between I/O port locations and memory address locations in optimal times, thereby increasing the efficiency of these transfers.

The foregoing disclosure and description of the invention are illustrative and explanatory thereof, and various changes in the size, shape, materials, components, circuitry, wiring connections and contacts, as well as in the details of the illustrated circuitry and construction and method of operation may be made without departing from the spirit of the invention.

We claim:

1. A direct memory access controller for use in a computer system having an n byte wide system address bus and locations for insertion of circuit boards for connection to the system address bus, the circuit boards including circuitry having the capability to operate as bus masters and control the system address bus, the direct memory access controller receiving memory address information as a plurality of single byte data units through an input/output port in the computer system, the direct memory access controller comprising:
  means for counting the number of bytes of memory address provided sequentially as data through the input/output port;
  means responsive to said counting means for determining if an n or n−1 byte wide address has been provided;
  means for storing said n or n−1 byte wide address determination; and
  means responsive to said n or n−1 wide determination storage means to provide an n−1 byte wide address to the system address bus when an n−1 byte wide address has been provided sequentially as data through the input/output port, and to provide an n byte wide address to the system address bus when an n byte wide address has been provided sequentially as data through the input/output port.

2. The direct memory access controller of claim 1, wherein the computer system further includes a cache memory controller and further comprising:
  means responsive to said n or n−1 byte wide determination storage means for providing an n byte wide address to the cache memory controller when an n−1 byte wide address is provided to the system bus.

3. The direct memory access controller of claim 2, further comprising:
  means for determining if a bus master utilizing only n−1 address bytes is controlling the system address bus; and
  wherein said means to provide an n byte address to the cache memory controller is also responsive to said bus master determination means.

4. The direct memory access controller of claim 1, wherein the computer system further ncludes a system data bus having a width of at least 2 bytes and direct memory access transfers are made by reading a memory location or input/output port and then writing to an input/output port or memory location, further comprising:
  means for transferring data between an odd starting address memory location and an even starting address input/output port in word width format in fewer cycles than required to transfer data between the memory and the direct memory access controller in byte widths and between the direct memory access controller and the input/output port in word widths for transfers greater than one word.

5. The direct memory access controller of claim 4, wherein said data transfer means includes means for temporarily storing the high byte of a word and means for providing said temporarily stored high byte as a low byte in a word and a low byte as a high byte in the word.

6. The direct memory access controller of claim 5, wherein said data transfer means further includes means for temporarily storing a second high byte of a word and the low byte of a word.

7. The direct memory access controller of claim 5, wherein said providing means includes two multiplexers, each multiplexer having inputs of the even and odd bytes, with one multiplexer outputting an odd byte and the other multiplexer outputting an even byte.

8. The direct memory access controller of claim 7, wherein said multiplexer outputting the even byte contains a third input connected to the outputs of said high byte temporary storage means.

9. The direct memory access controller of claim 7, wherein said data transfer means further includes a third multiplexer, said third multiplexer having inputs coupled to said even byte multiplexer output and inputs coupled to said high byte temporary storage means and outputting an even byte.

10. A circuit for use in a computer system having an n byte wide system address bus, having a direct memory access controller, having a cache memory controller utilizing an n byte wide memory address and having locations for insertion of circuit boards for connection to the system bus, the circuit boards including circuitry having the capability to operate a bus masters and control the system address bus, the circuit comprising:
  means for determining if a bus master utilizing only an n−1 byte wide address is controlling the system address bus and providing the n−1 least significant bytes of address; and
  means responsive to said determination means for providing the most significant byte of an n byte wide address on the system bus to the cache memory controller when said n−1 byte wide address bus master is utilizing the system address bus and providing the n−1 least significant bytes of the n byte wide address,
  wherein the most significant byte of said n byte wide address provided to the cache memory controller is comprised of logic low values.

11. The circuit of claim 10, further comprising:
  means for determining if the direct memory access controller is providing only an n−1 byte wide address to the system address bus; and
  wherein said means for providing an n byte wide address to the cache memory controller is also responsive to said direct memory access determination means.

12. A direct memory access controller for use in a computer system including a system data bus having a width of at least 2 bytes and wherein said direct memory access transfers are made by reading a memory location or input/output port and then writing to an input/output port or memory location, the direct memory access controller comprising:
  means for transferring data between an odd starting address memory location and an even starting address input/output port in word width format in fewer cycles than required to transfer data between the memory and the direct memory access controller in byte widths and between the direct memory access controller and the input/output port in word widths for transfers greater than one word,
  wherein said data transfer means includes means for temporarily storing the odd byte of a word and means for providing said temporarily stored odd byte as a low byte in a word and a even byte as a odd byte in the word, and
  wherein said providing means includes two multiplexers, each multiplexer having inputs of the odd and even bytes, with one multiplexer outputting an odd byte and the other multiplexer outputting an even byte.

13. The direct memory access controller of claim 12, wherein:
  said multiplexer outputting the even byte contains a third input connected to the outputs of said high byte temporary storage means.

14. The direct memory access controller of claim 12, wherein:
  said data transfer means further includes a third multiplexer, said third multiplexer having inputs coupled to said even byte multiplexer output and inputs coupled to said high byte temporary storage means and outputting an even byte.

* * * * *

UNITED STATES PATENT AND TRADEMARK OFFICE
CERTIFICATE OF CORRECTION

PATENT NO. : 5,214,767

DATED : May 25, 1993

INVENTOR(S) : Christopher C. Wanner, et al.

It is certified that error appears in the above-identified patent and that said Letters Patent is hereby corrected as shown below:

In col. 19, line 11, after "n-1" please insert --byte--.

In col. 19, line 35, please replace "nclude" with --include--.

Signed and Sealed this

Twenty-fifth Day of January, 1994

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,214,767  
DATED : May 25, 1993  
INVENTOR(S) : Christopher C. Wanner et al.

Page 1 of 1

It is certified that error appears in the above-identified patent and that said Letters Patent is hereby corrected as shown below:

Column 19,  
Line 35, delete "ncludes" and insert therefor -- includes --.

Column 20,  
Line 10, after "operate" delete "a" and insert therefor -- as --.

Signed and Sealed this

Twenty-fifth Day of October, 2005

JON W. DUDAS  
*Director of the United States Patent and Trademark Office*